(12) United States Patent
Klisan

(10) Patent No.: US 11,629,692 B1
(45) Date of Patent: Apr. 18, 2023

(54) VERTICAL SPIRAL WIND TURBINE

(71) Applicant: Benjamin Patrick Klisan, Akron, OH (US)

(72) Inventor: Benjamin Patrick Klisan, Akron, OH (US)

( * ) Notice: Subject to any disclaimer, the term of this patent is extended or adjusted under 35 U.S.C. 154(b) by 0 days.

(21) Appl. No.: 17/591,784

(22) Filed: Feb. 3, 2022

(51) Int. Cl.
| | |
|---|---|
| *F03D 3/00* | (2006.01) |
| *F03D 3/02* | (2006.01) |
| *F03D 3/06* | (2006.01) |
| *F03D 7/02* | (2006.01) |
| *F03D 9/25* | (2016.01) |

(52) U.S. Cl.
CPC ............... *F03D 3/005* (2013.01); *F03D 3/02* (2013.01); *F03D 3/061* (2013.01); *F03D 7/0204* (2013.01); *F03D 9/25* (2016.05); *F05B 2240/213* (2013.01); *F05B 2270/321* (2013.01)

(58) Field of Classification Search
CPC ... F03D 3/005; F03D 9/25; F03D 3/02; F03D 3/061; F03D 7/0204; F05B 2240/213; F05B 2270/321
See application file for complete search history.

(56) References Cited

U.S. PATENT DOCUMENTS

| | | | | |
|---|---|---|---|---|
| 2006/0108809 A1* | 5/2006 | Scalzi | ....................... | B60L 8/00 290/55 |
| 2010/0158673 A1* | 6/2010 | Keene | ..................... | F03D 3/049 415/121.3 |
| 2020/0040870 A1* | 2/2020 | Monto | .................... | F03D 3/005 |
| 2020/0408191 A1* | 12/2020 | Kittel | ..................... | F03D 3/005 |

\* cited by examiner

*Primary Examiner* — Viet P Nguyen
(74) *Attorney, Agent, or Firm* — Ulmer & Berne LLP; Alexander J. Johnson

(57) ABSTRACT

The present invention teaches a vertical axis wind turbine including a base structure; a yaw system secured to the base structure; a rotatable turbine main body secured to the yaw system, a main shaft rotor including a plurality of vertical rotor blades secured to the main shaft rotor for the collection of wind energy located within the turbine main body, and an electrical control system to control the yaw system. The turbine main body includes a single spiral stator having a single vertically aligned opening. The yaw system rotates the rotatable turbine main body to align or not align the single vertically aligned opening with the wind.

9 Claims, 10 Drawing Sheets
(4 of 10 Drawing Sheet(s) Filed in Color)

VERTICAL SPIRAL WIND TURBINE

FIELD OF THE INVENTION

The present invention relates to the field of wind turbines. Specifically, the present invention relates to the field of vertical wind turbines. More specifically, the present invention relates to a vertical wind turbine having a spiral stator that more efficiently funnels wind into the rotor blades as compared to previous vertical wind turbines.

BACKGROUND OF THE INVENTION

Conventional wind turbines utilize the energy of the wind to turn propeller-like blades around a rotor. The rotor is connected to a generator that spins to generate electricity. Wind turbines are preferably mounted on a tall structure or are themselves quite tall so as to receive the full effects of the wind, yet not disturb the immediate environment. Typically, wind turbines are positioned about thirty meters above the ground where they can take advantage of winds that are not affected by ground effect obstructions. Wind turbines generally consist of blades that spin with respect to two orientations, a vertically orientated axis, or a horizontally orientated axis.

Wind energy is a clean fuel source which will not pollute the air in the same way as power plants that rely on the combustion of coal or natural gas. Wind turbines that rotate about a horizontal axis are best suited for large unobstructed areas hence the creation of the wind farms. Vertically disposed wind turbines are well suited for congested areas, such as residential neighborhoods.

Wind power must compete with conventional generation sources on a cost basis. Depending on how energetic a wind site is, the wind farm may or may not be cost competitive. Even though the cost of wind power has decreased dramatically in the past ten years, the technology still requires a higher initial investment than fossil-fueled generators as they typically operate at ten percent efficiency.

Further, although wind power plants have negligible impact on the environment compared to other conventional power plants, there is some concern over the noise produced by the rotor blades, aesthetic impacts, and sometimes birds that have been killed by flying into the rotors of wind turbines that rotate about a horizontal axis.

The need for renewable energy sources is constantly increasing. A focus on improved wind turbines has steadily increased over time. The general issue with wind turbines relates to the inefficient transfer of kinetic energy to mechanical energy for power generation. A conventional wind turbine converts as little as ten percent of the possible kinetic energy into mechanical energy for electricity generation due to the many factors that affect the efficiency of a conventional wind turbine.

As stated above, vertical axis wind turbines are known and typically have a central vertical rotor section having a plurality of rotor vanes that wind acts against to rotate the wind turbine, and wind from any direction will impact the wind turbine in some manner. The orientation of a typical vertical axis wind turbine remains unchanged regardless of wind direction, unlike a horizontal axis wind turbine which must be turned to face the wind. However, because wind from any direction can act on a typical vertical axis wind turbine, there is no way to protect a typical vertical axis wind turbine from strong wind that could damage the turbine.

What is lacking in the art is a wind turbine having a vertically orientated axis capable of improving upon the efficiencies necessary to convert a higher amount of kinetic energy into mechanical energy while also being able to protect the wind turbine from damage when wind is too strong. The present invention addresses these and other shortcomings by introducing a vertical wind turbine power generator having a spiral stator that more efficiently funnels wind into the rotor blades as compared to previous vertical wind turbines.

SUMMARY OF THE INVENTION

An embodiment of the present invention provides a vertical axis wind turbine comprising: a base structure; a yaw system secured to said base structure; a rotatable turbine main body secured to said yaw system, comprising a single spiral stator having a single vertically aligned opening; an electrical control system to control the yaw system; and a main shaft rotor including a plurality of vertical rotor blades secured to said main shaft rotor for the collection of wind energy located within the turbine main body; wherein said yaw system rotates said rotatable turbine main body to align or not align the single vertically aligned opening with the wind.

Another embodiment of the present invention provides a vertical axis wind turbine as in any embodiment above, further comprising a lower gearbox generator operably connected to the main shaft rotor to produce electricity from the collected wind energy and wherein the lower gearbox generator is positioned within the base structure.

Another embodiment of the present invention provides a vertical axis wind turbine as in any embodiment above, wherein the base structure is selected from the group consisting of a tower and a building.

Another embodiment of the present invention provides a vertical axis wind turbine as in any embodiment above, wherein the yaw system comprises a yaw motor assembly, an internal slew gear, and an external slew gear.

Another embodiment of the present invention provides a vertical axis wind turbine as in any embodiment above, wherein the electrical control system comprises an electrical controller, a wind vane, and an anemometer; and wherein the wind vane and the anemometer are secured on a top portion of the electrical control system and collect wind data to supply to the electrical controller so that the electrical control system can direct the yaw system to rotate.

Another embodiment of the present invention provides a vertical axis wind turbine as in any embodiment above, further comprising a control enclosure and a yaw system enclosure, and wherein the electrical control system is housed within the control enclosure and the yaw system is housed within the yaw system enclosure.

Another embodiment of the present invention provides a vertical axis wind turbine as in any embodiment above, wherein the yaw system enclosure is secured to the base structure and the rotatable turbine main body is secured to the yaw system enclosure.

Another embodiment of the present invention provides a vertical axis wind turbine as in any embodiment above, wherein the control enclosure is secured to the vertical axis wind turbine at a position above the rotatable turbine main body.

Another embodiment of the present invention provides a vertical axis wind turbine as in any embodiment above, further comprising an upper rotor, an upper gearbox generator, an upper rotor support unit, and an upper gearbox enclosure unit.

Another embodiment of the present invention provides a vertical axis wind turbine as in any embodiment above, wherein the upper rotor support unit is secured to a top portion of the rotatable turbine main body and houses the upper rotor; wherein the upper gearbox enclosure unit is secured to a top portion of the upper rotor support and houses the upper gearbox generator; and wherein the control enclosure is secured to a top portion of the upper gearbox enclosure unit.

Another embodiment of the present invention provides a vertical axis wind turbine as in any embodiment above, wherein the upper rotor contains a plurality of horizontal rotor blades for the collection of the wind energy collected by the plurality of vertical rotor blades of the main shaft rotor.

Another embodiment of the present invention provides a vertical axis wind turbine as in any embodiment above, wherein the upper gearbox generator produces a second source of electricity from the collected wind energy.

Another embodiment of the present invention provides a vertical axis wind turbine as in any embodiment above, wherein each vertical rotor blade of the plurality of vertical rotor blades has a helical surface configuration.

Another embodiment of the present invention provides a vertical axis wind turbine as in any embodiment above, wherein the plurality of vertical rotor blades comprises between 2 and 10 vertical rotor blades and wherein each said vertical rotor blade are circumferentially equally spaced apart from the rotor main body in an annular array.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of this invention will now be described by way of example only in association with the accompanying drawings in which.

DETAILED DESCRIPTION OF ILLUSTRATIVE EMBODIMENTS

Embodiments of the present invention are based, at least in part, upon the discovery of a vertical wind turbine power generator that more efficiently funnels wind into the rotor blades. In one or more embodiments, the vertical wind turbine includes a spiral stator that encases the rotor blades. Because of the spiral nature of the stator surrounding and encasing the rotor blades, the wind is more efficiently funneled to the rotor blades which leads to a more efficient vertical wind turbine power generator as compared to previous iterations of vertical wind turbine power generators that lacked a spiral stator.

Figure 1:
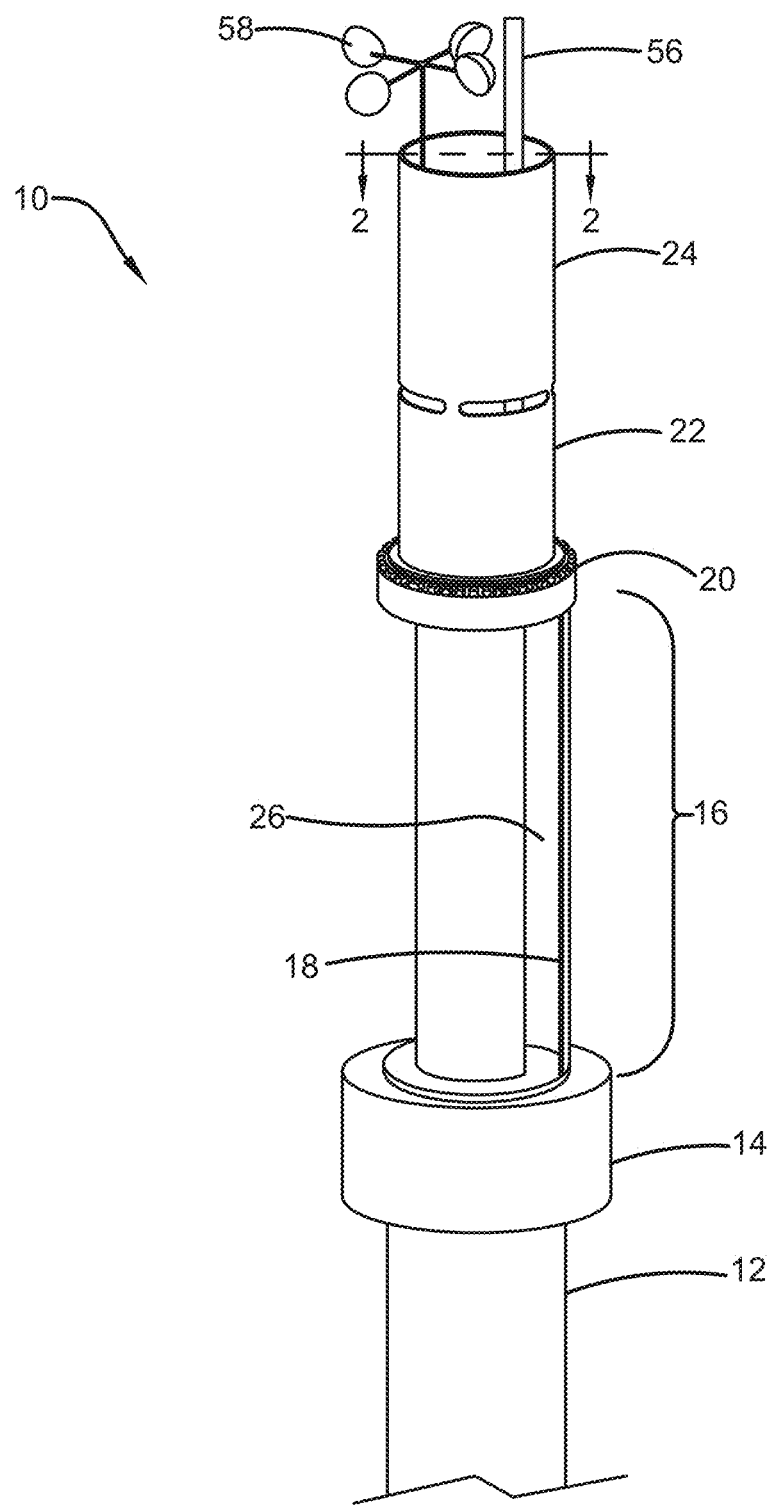
FIG. 1 is a perspective drawing of the vertical spiral wind turbine of an embodiment the present invention.

An exemplary vertical wind turbine can be shown with reference to FIG. 1, which shows a vertical wind turbine 10 in accordance with an embodiment of the present invention. Turbine 10 includes a base structure such as tower 12, a yaw system enclosure unit 14, a turbine main body 16 including a single spiral stator 18, an optional upper rotor support unit 20, an optional upper gearbox enclosure unit 22, and a control enclosure 24. Tower 12 is used to secure the turbine 10 to the ground or to the top of a structure while at the same time supporting the rest of the components of turbine 10. Yaw system enclosure unit 14 has the yaw system (to be discussed below) enclosed within, to keep the yaw system protected from the surrounding environment. The turbine main body 16 includes the spiral stator 18 which funnels wind into the rotor blades (to be discussed below). The spiral stator 18 of the turbine main body 16 includes a single vertical opening 26.

Optional upper rotor support unit 20, if present, houses an optional upper rotor (to be discussed below) while providing a point of connection between the turbine main body 16 and the optional upper gearbox enclosure unit 22. Optional upper gearbox enclosure unit 22 is only present if the optional upper rotor is present and houses the optional upper gearbox (to be discussed below) while providing a point of connection for the control enclosure 24 to the turbine 10. Control enclosure 24 houses the electrical control system (to be discussed below).

Figure 2:
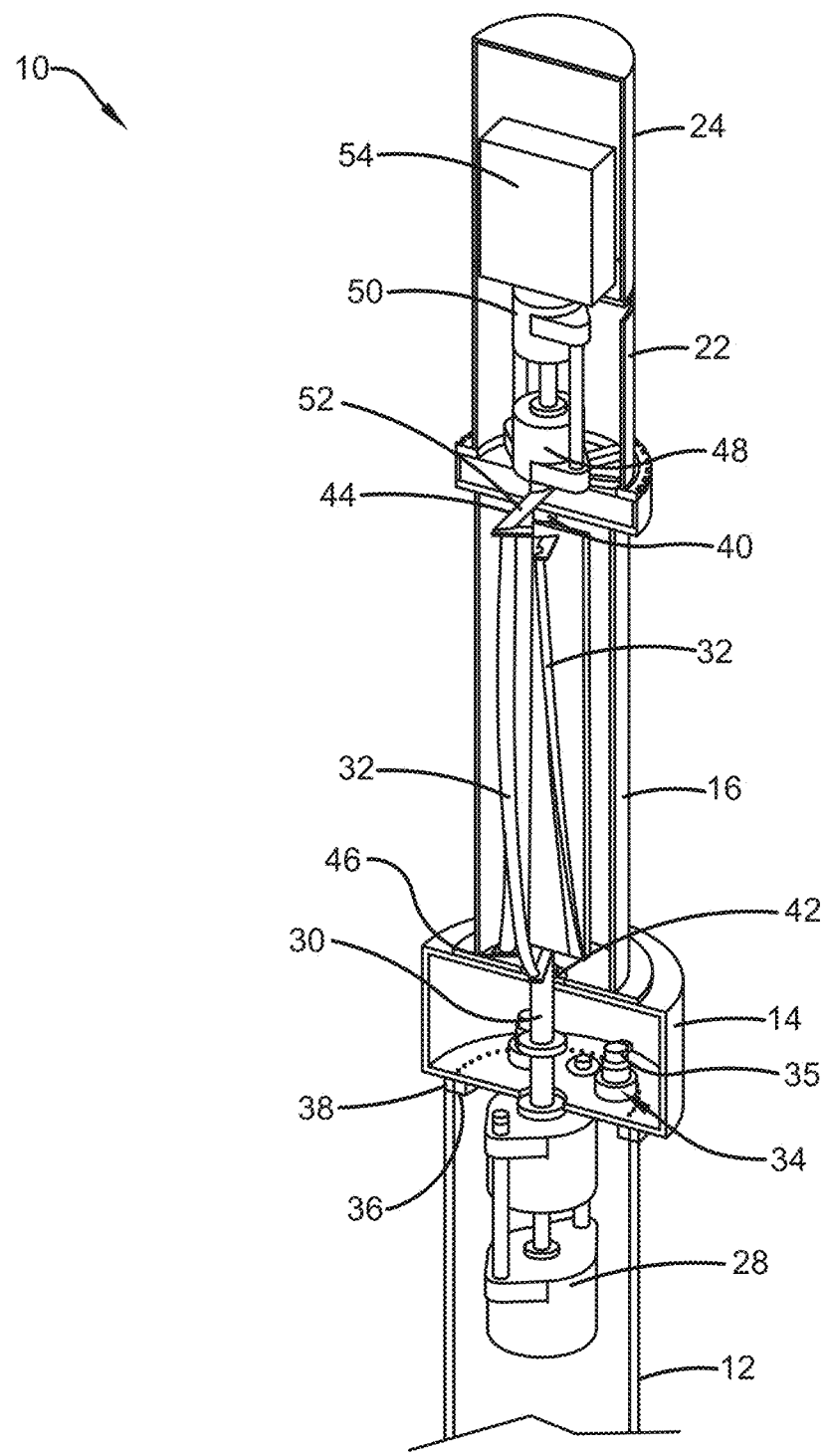
FIG. 2 is a perspective drawing taken along line 2-2 of FIG. 1 showing the internal components of the vertical spiral wind turbine of an embodiment of the present invention.

FIG. 2 depicts the innerworkings of the turbine 10 of FIG. 1 as shown along line 2 of FIG. 1. The innerworkings of turbine 10 include a lower gearbox generator 28 located within the tower 12 below the yaw enclosure unit 14. The lower gearbox generator 28 works with the main shaft rotor 30 to create electricity. The use and conversion of the rotational energy created by the main shaft rotor 30 to create electrical energy is believed to be within the scope of the prior art, and therefore will not be specifically described herein. While most of the main shaft rotor 30 is located within the confines of the turbine main body 16, a portion of said main shaft rotor 30 is located within the yaw enclosure unit 14 and the end portion of the main shaft rotor 30 connects to the lower gearbox generator 28 located within the confines of the tower 12.

In one or more embodiments of the present invention, a width of the single vertical opening 26 of the spiral stator 18 is related to the diameter of the span of the rotor blades 32, in particular, the width of the single vertical opening 26 of the spiral stator 18 is equal to half the diameter of the span of the rotor blades 32. For example, if a circle is drawn around the outer edges of the rotor blades 32, and the diameter of that circle is 3 feet, then the width of the single vertical opening 26 of the spiral stator 18 would be 1.5 feet. This relationship relates to the pitch of the spiral stator 18 to allow for clearance of the rotor blades 32.

In one or more embodiments of the present invention, there would be wire mesh located over the single vertical opening 26 in order to keep animals and debris from entering the turbine 10, while still allowing for the wind to enter through the single vertical opening 26.

Figure 3:
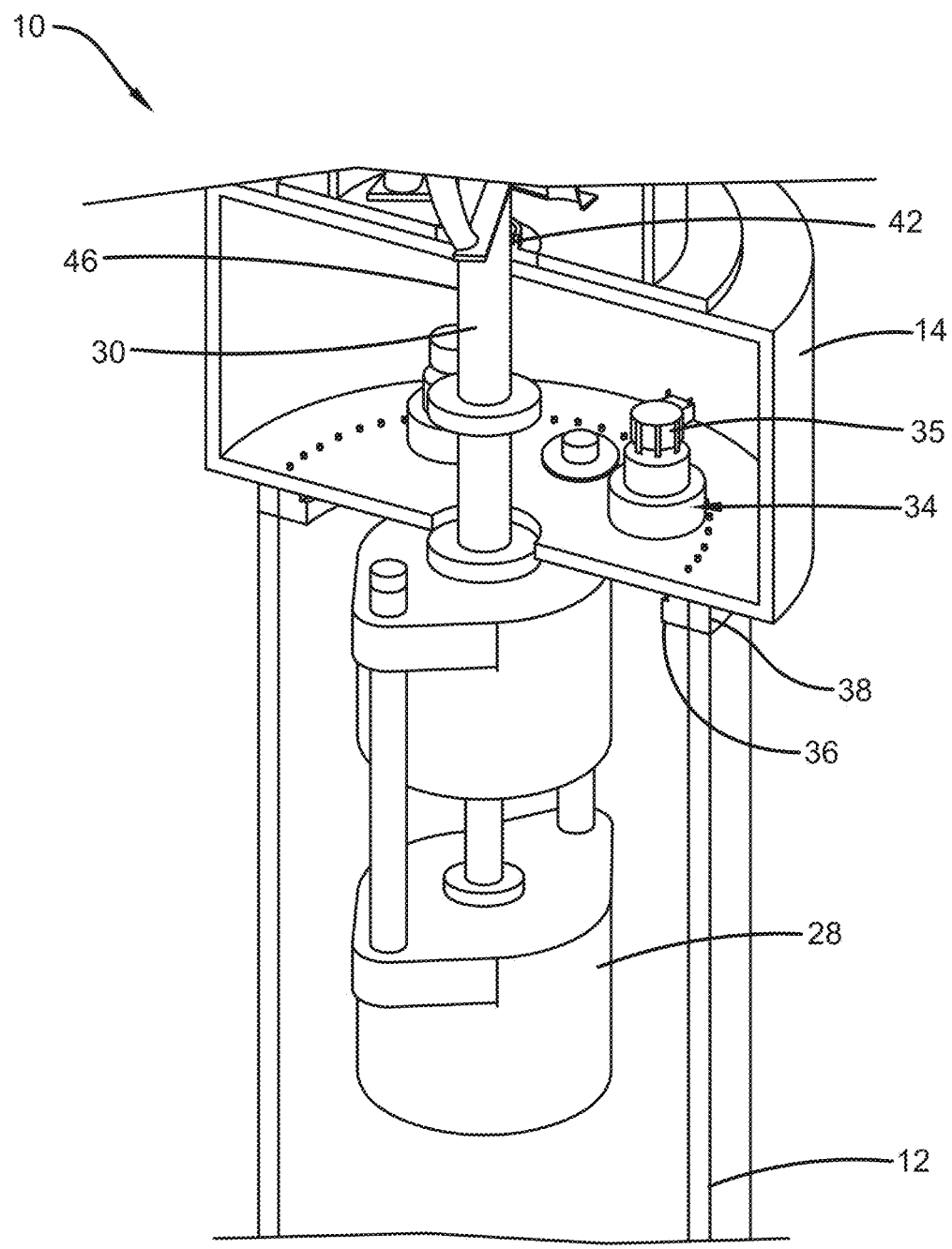
FIG. 3 is a perspective drawing showing in closer detail the internal components housed in the base structure and yaw enclosure unit of the vertical spiral wind turbine of an embodiment of the present invention.
Figure 4:
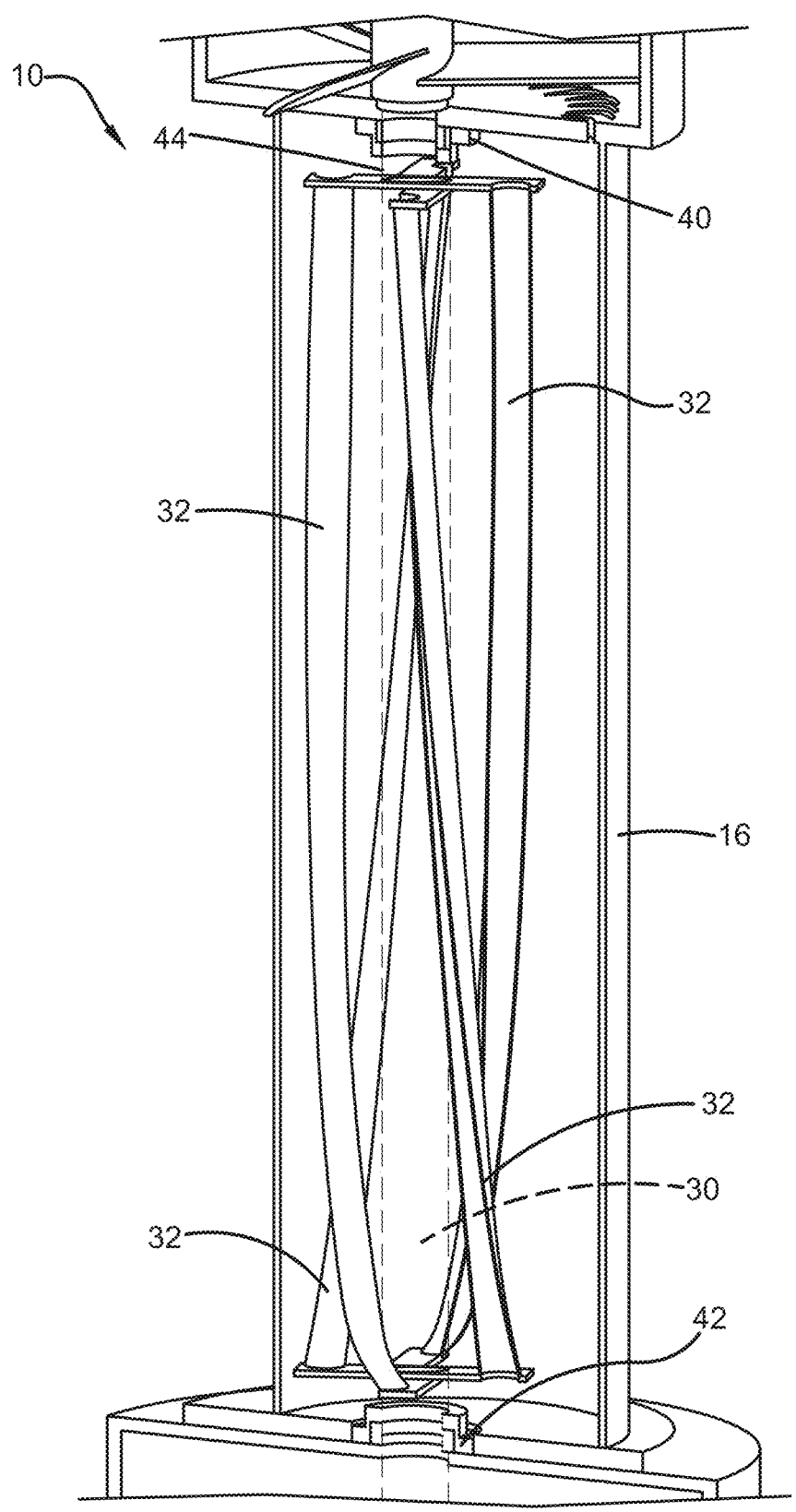
FIG. 4 is a perspective drawing showing in closer detail the internal components housed in the turbine main body of the vertical spiral wind turbine of an embodiment of the present invention.

The main shaft rotor 30 additionally includes a plurality of helical vertical rotor blades 32, the shape of these will be discussed in detail below. The innerworkings of the turbine 10 also includes a yaw motor assembly 34, an internal slew gear 36, an external slew gear 38, a main shaft bearing 40, and a main shaft bearing retainer 42. The innerworkings of the lower gearbox generator 28 working in conjunction with the main shaft rotor 30 and the yaw motor assembly 34 are shown in more detail in FIG. 3 and the innerworkings of the turbine main body 16 are shown in more detail in FIG. 4.

The yaw motor assembly 34 includes a plurality of drive motors 35 that include smaller gears (not shown) that mesh with the internal slew gear 36 and the external slew gear 38 to rotate the turbine main body 16 and everything secured to the top of the turbine main body 10. The specific details of how the yaw system works, including the yaw motor assembly 34, the internal slew gear 36, and the external slew gear 38, is believed to be within the scope of the prior art, and therefore will not be described in more detail herein. The main shaft bearing 40 is located at a top end 44 of the main shaft rotor 30 within the confines of the turbine main body 16 and the main shaft bearing retainer 42 is located at a bottom end 46 of the main shaft rotor 30 within the confines of the turbine main body 16. The main shaft bearing 40 and the main shaft bearing retainer 42 support the rotation of the main shaft rotor 30.

Figure 5:
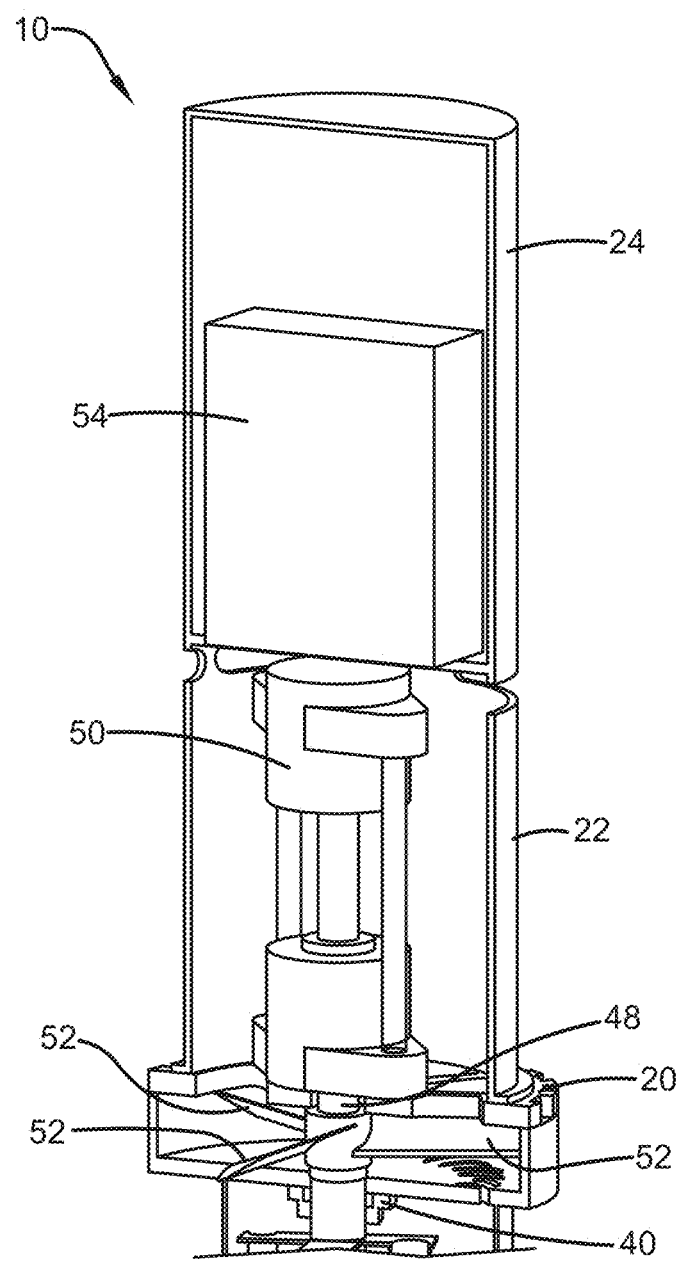
FIG. 5 is a perspective drawing showing in closer detail the internal components housed in the optional upper rotor support unit, optional upper gearbox enclosure unit, and control enclosure of the vertical spiral wind turbine of an embodiment of the present invention.

As shown in more detail in FIG. 5, the turbine 10 can also include an optional upper rotor 48 and an optional upper gearbox generator 50 to provide for an additional source of forming electricity. The optional upper rotor 48 includes a plurality of horizontal rotor blades 52. The optional upper gearbox generator 50 works with the optional upper rotor 48 to create an additional source of electricity coming from turbine 10 in conjunction with the lower gearbox generator 28 working with the main shaft rotor 30. As stated above with the lower gearbox generator 28, the use and conversion of the rotational energy created by the optional upper rotor 48 to create electrical energy is believed to be within the scope of the prior art, and therefore will not be specifically described herein. The turbine 10 also includes an electrical control system including an electrical controller 54 located within the control enclosure 24. If the optional upper rotor 48 and optional upper gearbox generator 50 were not included in the construction of turbine 10, then the top rotor support 20 would be replaced with a mounting plate (not shown) and the control enclosure 24 would be mounted to the top of the turbine main body 16 using the mounting plate.

In one or more embodiments, if the optional upper gearbox generator 50 is present, then there would be wire mesh and steel louvers over the slots in the upper gearbox generator 50 in order to keep animals and debris from entering the turbine 10, while still allowing for the wind to exit out of the upper gearbox generator 50 after it has entered the turbine 10 through the single vertical opening 26. In one or more embodiments, if the optional upper gearbox generator 50 is not present, then the mounting plate (not shown) would then contain a wire mesh cover.

The electrical controller 54 of the electrical control system controls the yaw motor assembly 34 to rotate the turbine main body 16. The electrical control system also includes a wind vane 56 and an anemometer 58 mounted on the top of the controller enclosure 24 and used to collect wind data for the electrical controller 54. The wind vane 56 determines the direction from which the wind is blowing, then the electrical controller 54 uses that data to direct the yaw motor assembly 34 to rotate the turbine 10 to line up the single vertical opening 26 such that the largest amount of wind can enter the turbine 10 and rotate the helical vertical rotor blades 32. The anemometer 58 determines the speed of the wind, then the electrical controller 54 can use this data to determine if the wind is blowing to slow such that electricity would not be produced, or to fast such that damage to the turbine 10 may occur if put in use. If the electrical controller 54 determines that the wind is either too slow or too fast, then the electrical controller 54 directs the yaw motor assembly 34 to rotate the turbine 10 such that the vertical opening 26 is not lined up in a position to allow for wind to enter the turbine 10.

In one or more embodiments of the present invention, the number of helical vertical rotor blades 32 will be between 2 and 10, but most preferably there will be between 3 and 5 helical vertical rotor blades 32. In one or more embodiments of the present invention, each helical vertical rotor blade 32 has at least a portion thereof which has a curved configuration in the "x" and "y" axis, and additionally has at least a portion thereof which has a non-linear configuration in the "z", also known as the longitudinal axis of the main shaft rotor 30. In one or more embodiments, the non-linear portion of each helical vertical rotor blades 32 is in the form of a helix. In other words, each helical vertical rotor blade 32 has a helical surface configuration. In one or more embodiments of the present invention, each helical vertical rotor blades 32 is configured to be circumferentially equally spaced apart about the main shaft rotor 30 in a circular array.

Figure 6:
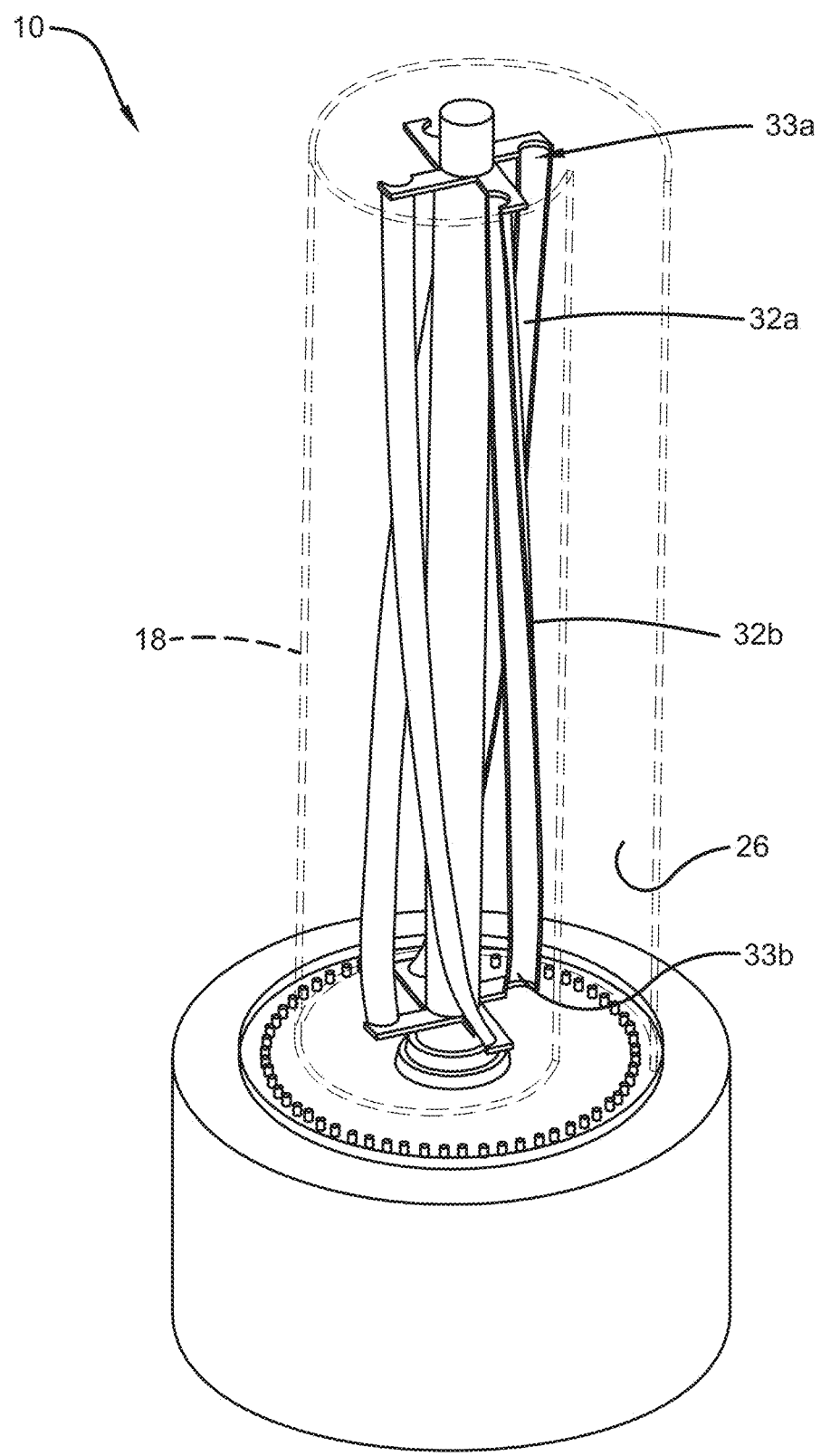
FIG. 6 is a perspective drawing showing in closer detail the relationship between the spiral stator of the turbine main body and the helical vertical rotor blades of the main shaft rotor.

The helical design and equal spacing of each of the helical vertical rotor blades 32, along with the single vertical opening 26 of the spiral stator, allows for wind directed through the vertical opening 26 into the interior of the turbine main body to simultaneously be directed against the top portion 33a of a first helical vertical rotor blade 32a and a bottom portion 33b of a second helical vertical rotor blade 32b. In this context, a first helical vertical rotor blade 32 is defined as being in a counterclockwise position as compared to the position of the second helical vertical rotor blade 32. This allows for the vertical wind turbine 10 to work more efficiently than vertical wind turbines of the prior art. This relationship is best shown in FIG. 6.

The helical design and equal spacing of each of the helical vertical rotor blades 32 as discussed above, also allows for all wind directed through the vertical opening 26 against the helical vertical rotor blades 32 to exit the turbine main body 16 through the upper portion of said turbine main body 16. Therefore, in the embodiments of the present invention wherein the optional upper rotor 48 and optional upper gearbox generator 50 are present, the wind utilized to first operate the lower gearbox generator 28 can be easily used again by the upper rotor 48 and upper gearbox generator 50 because the wind is directed in that direction. In embodiments when the optional upper rotor 48 and optional upper gearbox generator 50, the helical design and equal spacing of each helical vertical rotor blade 32 also allows for the wind to easily leave the turbine main body 16 through its upper portion, without affecting the rotation of an of the helical vertical rotor blades 32.

In light of the foregoing, it should be appreciated that the present invention significantly advances the art by providing a spiral vertical wind turbine that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

In order to highlight the benefits of the vertical spiral wind turbine of the present invention, a wind flow analysis comparison was done with the vertical spiral wind turbine of the present invention and an embodiment of the vertical wind turbine as disclosed in U.S. Pat. No. 9,022,721 to Zha et al. The wind flow analysis was done using SolidWorks® flow simulation software. The wind turbine of Zha is similar to that of the present invention inasmuch as both wind turbines create a vortex to accelerate and direct wind to drive the vertical rotor. The main differences being that the vertical spiral wind turbine of the present invention utilizes a yaw system to rotate the wind turbine, specifically the positioning of the single vertical opening of the spiral stator into the wind to provide constant torque on all rotor blades and to deflect turbulence more easily. Whereas the wind turbine of Zha utilizes stationary intermittent stators which will catch wind from all directions, without offering any protection from turbulence.

Figure 7A:
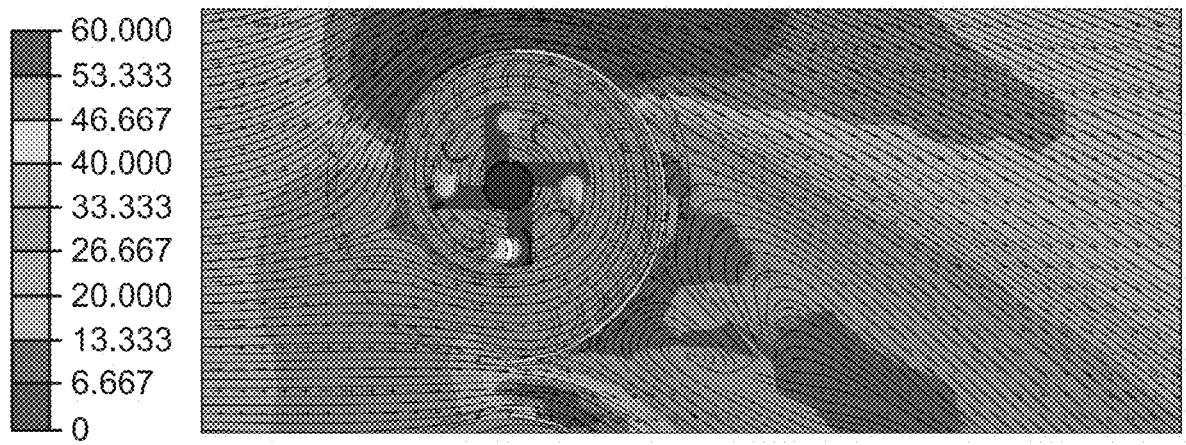
FIG. 7a is a cut plot of the wind velocity of a Computational Fluid Dynamics (CFD) flow simulation utilizing a single vertical spiral wind turbine of the present invention.
Figure 7B:
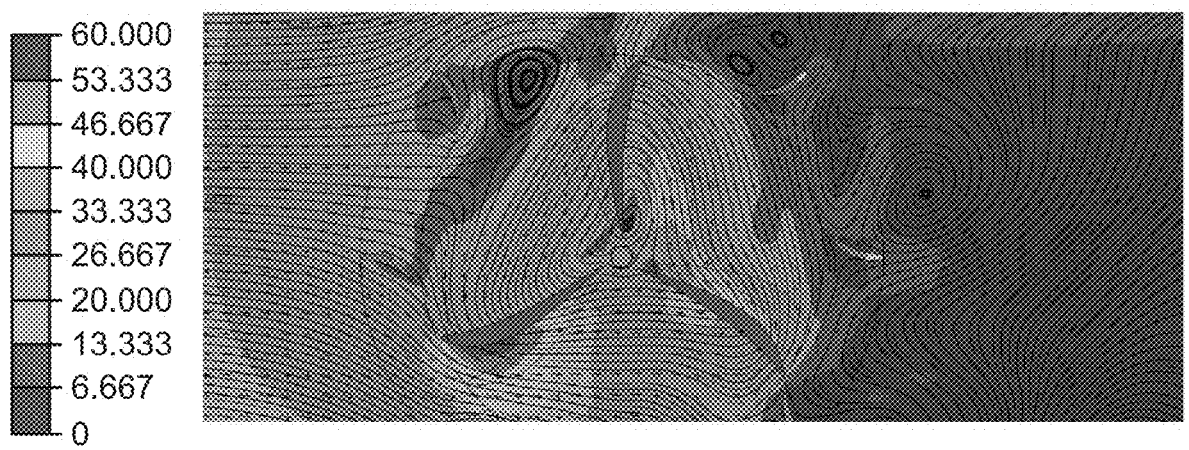
FIG. 7b is a cut plot of the wind velocity of a CFD flow simulation utilizing an embodiment of a single wind turbine based on the teachings disclosed in U.S. Pat. No. 9,022,721 to Zha et al.

FIG. 7a is a cut plot of the wind velocity of a Computational Fluid Dynamics (CFD) flow simulation utilizing a single vertical spiral wind turbine of the present invention and FIG. 7b is a cut plot of the wind velocity of a CFD flow simulation utilizing an embodiment of a single wind turbine based on the teachings of Zha. FIG. 7a shows how the single vertical spiral wind turbine of the present invention creates a vortex that applies torque on each rotor blade without allowing oncoming wind to impede rotation of the rotor blades. This is due to being able to control the positioning of the single vertical opening of the spiral stator through the use of the yaw system of the vertical spiral wind turbine of the present invention. The wind will enter through the single vertical opening and can only flow within the main body of the vertical spiral wind turbine of the present invention in one direction. FIG. 7b shows how oncoming wind impeded rotation of the vertical rotor. The vortex created by the stators overcomes this impediment, but some efficiency is lost. The wind simulation to the lower right shows the oncoming wind split into two directions around the turbine. The lower portion is directed by the stators and forms the driving vortex but the upper portion hits against the driving vortex and creates a second opposing low-speed vortex, which acts in opposition to the blade rotation.

The low-speed vortex is shown by the dark and light blue area (5-20 ft/sec velocity) between the stator at the 10 o'clock and 12 o'clock positions in FIG. 7b. The streamlines show how the wind in this area flows in opposition to the preferred direction. The torque produced by the higher wind velocity of the yellow and green areas (24-44 ft/sec velocity) overcomes this opposition, but not without losing efficiency. The blue/green areas (20-40 ft/sec velocity) and streamlines in the spiral stator of FIG. 7a show a more consistent vortex, flowing in one direction with no counter flow of wind in the opposite direction. Each vertical rotor has a consistent velocity of wind pushing it throughout the simulation.

Figure 8A:
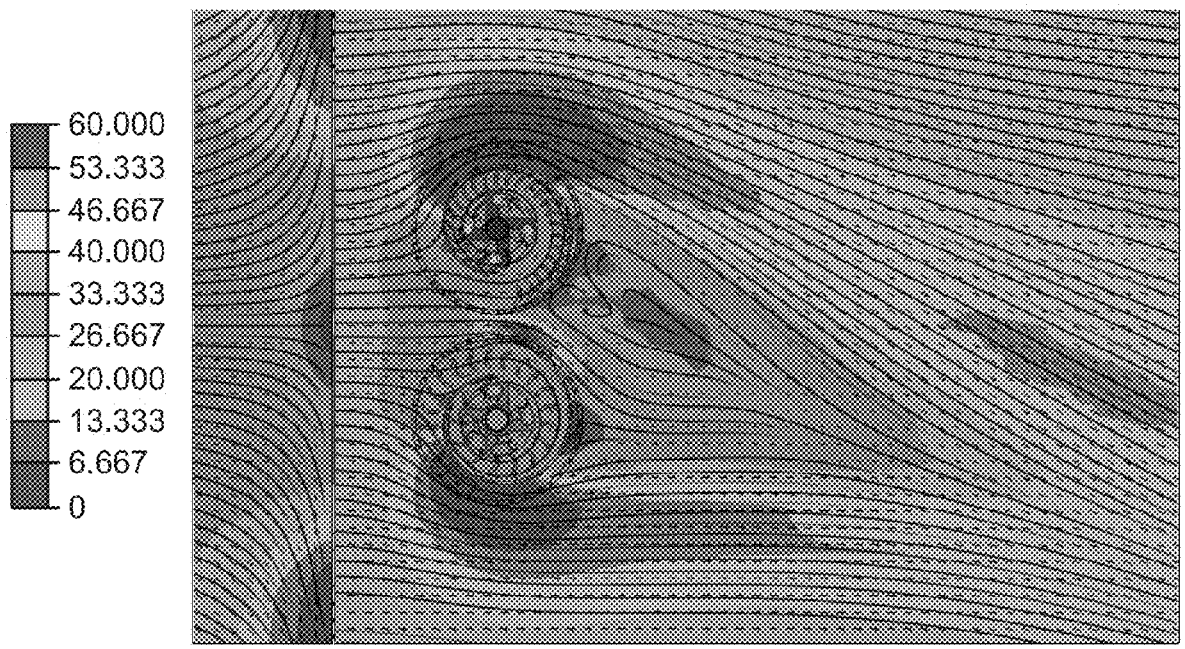
FIG. 8a is a cut plot of the wind velocity of a CFD flow simulation utilizing a pair of vertical spiral wind turbines of the present invention in a side-by-side orientation.
Figure 8B:
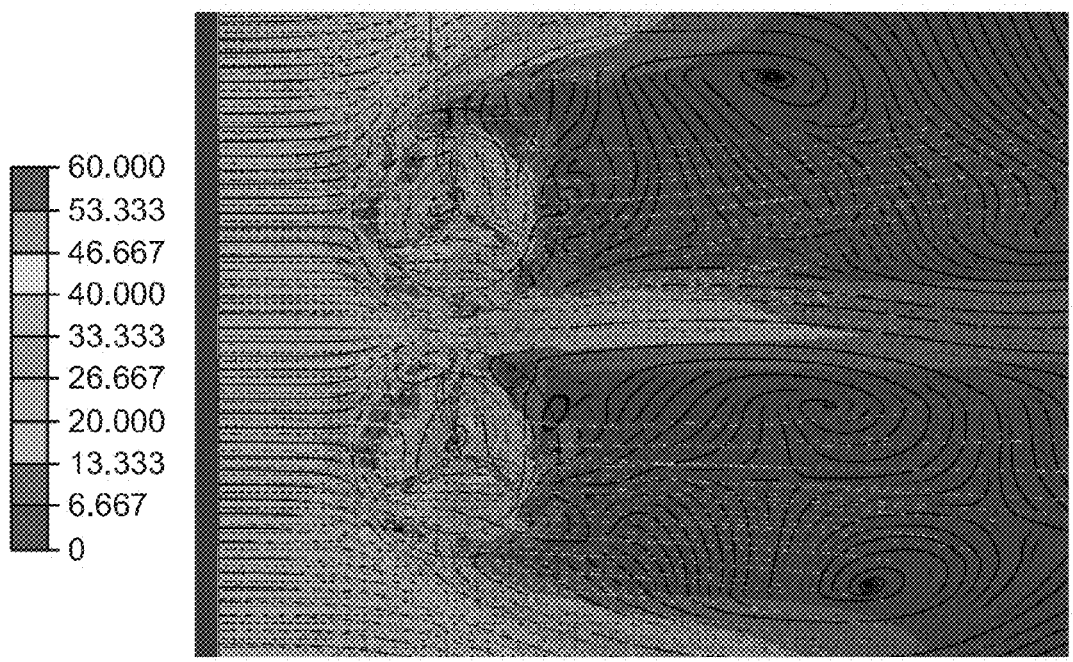
FIG. 8b is a cut plot of the wind velocity of a CFD flow simulation utilizing an embodiment of a pair of wind turbines based on the teachings of Zha in a side-by-side orientation.
Figure 9A:
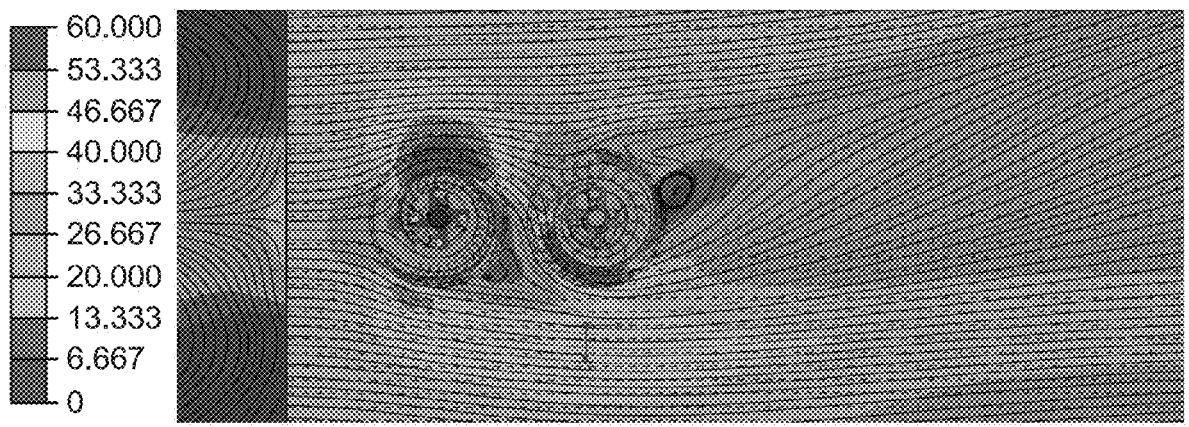
FIG. 9a is a cut plot of the wind velocity of a CFD flow simulation utilizing a pair of vertical spiral wind turbines of the present invention in a front-to-back orientation.
Figure 9B:
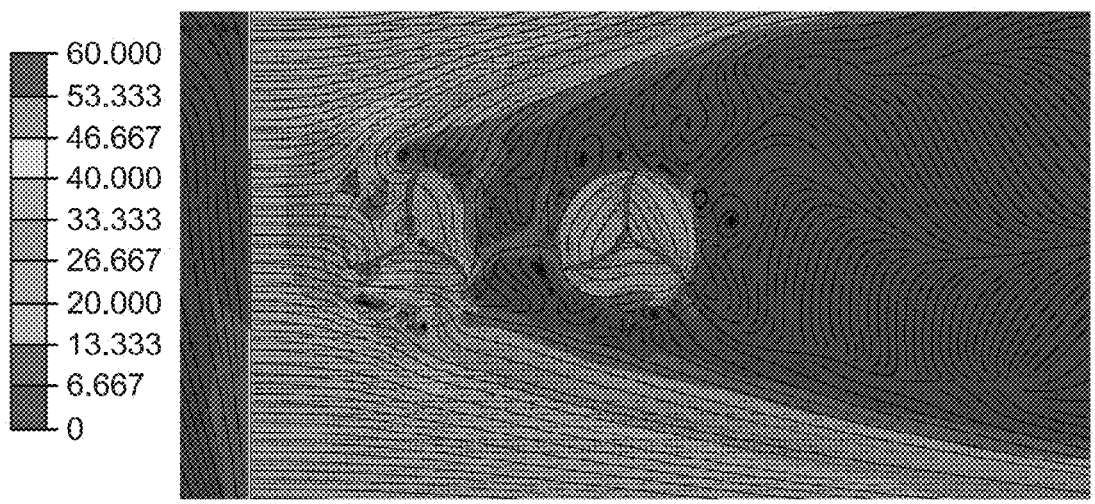
FIG. 9b is a cut plot of the wind velocity of a CFD flow simulation utilizing an embodiment of a pair of wind turbines based on the teachings of Zha in a front-to-back orientation.
Figure 10A:
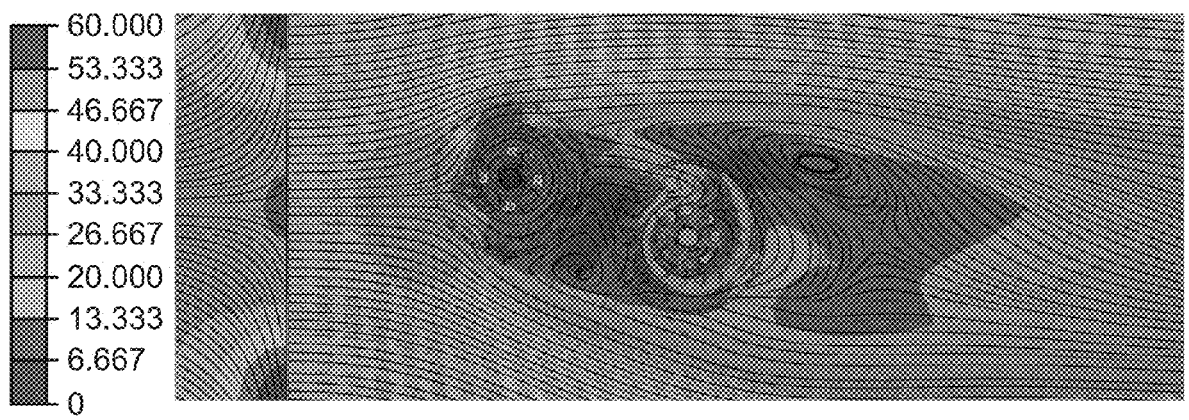
FIG. 10a is a cut plot of the wind velocity of a CFD flow simulation utilizing a pair of vertical spiral wind turbines of the present invention at an angled orientation.
Figure 10B:
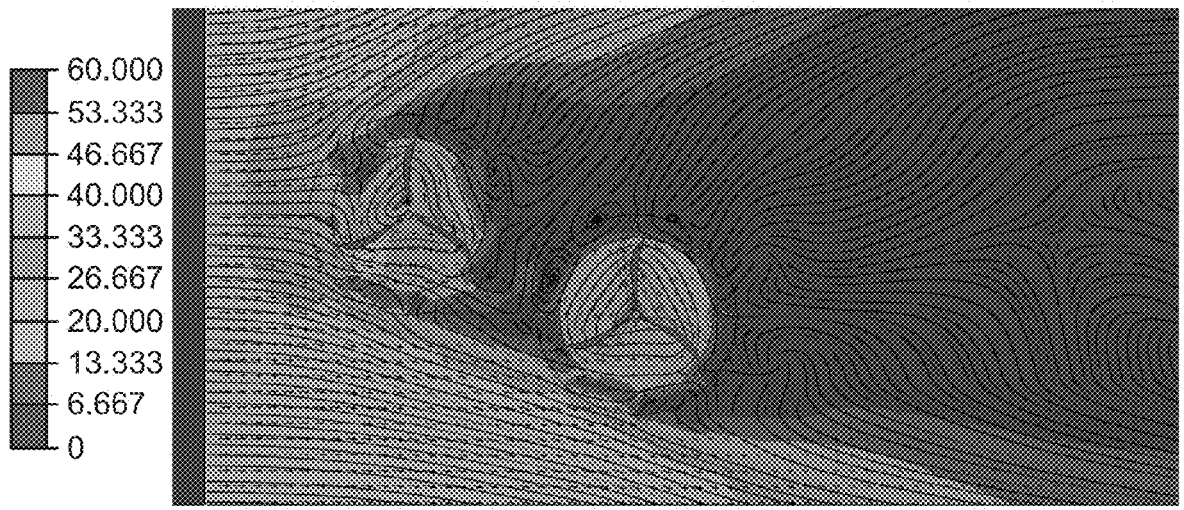
FIG. 10b is a cut plot of the wind velocity of a CFD flow simulation utilizing an embodiment of a pair of wind turbines based on the teachings of Zha at an angled orientation.

FIG. 8a is a cut plot of the wind velocity of a CFD flow simulation utilizing a pair of vertical spiral wind turbines of the present invention in a side-by-side orientation wherein the wind is flowing from left to right; FIG. 8b is a cut plot of the wind velocity of a CFD flow simulation utilizing an embodiment of a pair of wind turbines based on the teachings of Zha in a side-by-side orientation wherein the wind is flowing from left to right; FIG. 9a is a cut plot of the wind velocity of a CFD flow simulation utilizing a pair of vertical spiral wind turbines of the present invention in a front-to-back orientation wherein the wind is flowing from left to right; FIG. 9b is a cut plot of the wind velocity of a CFD flow simulation utilizing an embodiment of a pair of wind turbines based on the teachings of Zha in a front-to-back orientation wherein the wind is flowing from left to right; FIG. 10a is a cut plot of the wind velocity of a CFD flow simulation utilizing a pair of vertical spiral wind turbines of the present invention at an angled orientation wherein the wind is flowing from left to right; and FIG. 10b is a cut plot of the wind velocity of a CFD flow simulation utilizing an embodiment of a pair of wind turbines based on the teachings of Zha at an angled orientation wherein the wind is flowing from left to right.

What the plots of FIGS. 8a-10b show is that the vertical spiral wind turbines of the present invention work more efficiently than prior art wind turbines, such as those of Zha, because regardless of the direction of the incoming wind, the yaw systems of the vertical spiral wind turbines of the present invention will be able to properly place the positioning of the single vertical opening of the spiral stator to most effectively and efficiently harness the power of the wind to create energy. The vertical spiral wind turbines of the present invention minimize turbulence coming off the spiral stator body while preventing turbulence from other objects from affecting the vertical rotor. The near cylindrical shape of the spiral vertical wind turbines of the present invention allows the wind not captured by the stator to flow around the turbine more easily than prior art wind turbines, such as those of Zha, thereby creating less turbulence. Having the rotor enclosed by the spiral stator allows the original air flow, opposing vortexes, and turbulence from other objects to not impede the rotor.

The light and dark blue areas in both FIGS. 8a and 8b show the reduction in wind velocity, from the original 26-33 ft/sec to 6-12 ft/sec, after contacting the two turbine designs. The area of wind turbulence, denoted by the light and dark blues areas (6-12 ft/sec) to the right of the turbines, is significantly larger in FIG. 8b than FIG. 8a. The streamlines show how the wind flows more freely around the spiral stator in FIG. 8a, whereas the streamlines in FIG. 8b in the dark blue regions show the formation of additional vortexes. The greater area of low velocity turbulence and vortexes would have a more significant negative affect on the efficiency of additional wind turbines downwind from those of Zha in FIG. 8b. Similar affects are shown in the differences between FIG. 9a and FIG. 9b and between FIGS. 10a and 10b.

What is claimed is:

1. A vertical axis wind turbine comprising:
a base structure;
a yaw system secured to said base structure;
a rotatable turbine main body secured to said yaw system, comprising a single spiral stator having a single vertically aligned opening;
an electrical control system to control the yaw system;
a main shaft rotor including a plurality of vertical rotor blades secured to said main shaft rotor for the collection of wind energy located within the turbine main body;
a control enclosure;
an upper rotor;
an upper gearbox generator;
an upper rotor support unit; and
an upper gearbox enclosure unit;
wherein said yaw system rotates said rotatable turbine main body to align or not align the single vertically aligned opening with the wind, wherein the upper rotor support unit is secured to a top portion of the rotatable turbine main body and houses the upper rotor, wherein the upper gearbox enclosure unit is secured to a top portion of the upper rotor support unit and houses the upper gearbox generator, and wherein the control enclosure is secured to a top portion of the upper gearbox enclosure unit.

2. The vertical axis wind turbine of claim 1, further comprising a lower gearbox generator operably connected to the main shaft rotor to produce electricity from the collected wind energy and wherein the lower gearbox generator is positioned within the base structure.

3. The vertical axis wind turbine of claim 1, wherein the base structure is selected from the group consisting of a tower and a building.

4. The vertical axis wind turbine of claim 1, wherein the yaw system comprises a yaw motor assembly, an internal slew gear, and an external slew gear.

5. The vertical axis wind turbine of claim 1, wherein the electrical control system comprises an electrical controller, a wind vane, and an anemometer; and wherein the wind vane and the anemometer are secured on a top portion of the electrical control system and collect wind data to supply to the electrical controller so that the electrical control system can direct the yaw system to rotate.

6. The vertical axis wind turbine of claim 1, further comprising a yaw system enclosure, and wherein the electrical control system is housed within the control enclosure and the yaw system is housed within the yaw system enclosure.

7. The vertical axis wind turbine of claim 6, wherein the yaw system enclosure is secured to the base structure and the rotatable turbine main body is secured to the yaw system enclosure.

8. The vertical axis wind turbine of claim 1, wherein each vertical rotor blade of the plurality of vertical rotor blades has a helical surface configuration.

9. The vertical axis wind turbine of claim 1, wherein the plurality of vertical rotor blades comprises between 2 and 10 vertical rotor blades and wherein each said vertical rotor blade are circumferentially equally spaced apart from the rotor main body in an annular array.

* * * * *